(12) United States Patent
Gluf, Jr.

(10) Patent No.: US 6,443,422 B1
(45) Date of Patent: Sep. 3, 2002

(54) APPARATUS AND METHOD FOR ADJUSTING AN ACTUATOR ON A REAL-TIME BASIS

(75) Inventor: Carl G. Gluf, Jr., Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/877,970

(22) Filed: Jun. 8, 2001

(51) Int. Cl.[7] ............................................. F16K 31/02
(52) U.S. Cl. ........................... 251/129.18; 251/129.15; 251/248; 251/249.5; 335/273; 335/258
(58) Field of Search ....................... 251/129.18, 129.15, 251/248, 250, 249.5; 335/273, 258

(56) References Cited

U.S. PATENT DOCUMENTS

| | | | | |
|---|---|---|---|---|
| 125,363 A | * | 4/1872 | Wellington .................. 251/248 |
| 1,777,115 A | * | 9/1930 | Bruback et al. ............. 251/248 |
| 2,901,008 A | * | 8/1959 | Cavett et al. ............... 141/207 |
| 2,975,795 A | * | 3/1961 | Allen ......................... 137/315 |
| 2,995,337 A | * | 8/1961 | Tanner ....................... 251/282 |
| 3,034,371 A | * | 5/1962 | Cantalupo et al. .......... 251/248 |
| 3,095,903 A | * | 7/1963 | Jennings ................. 137/625.25 |
| 3,742,407 A | * | 6/1973 | Cardew et al. ............. 335/258 |
| 4,231,389 A | * | 11/1980 | Still et al. .................... 137/315 |
| 4,342,973 A | | 8/1982 | Stone et al. .................... 335/2 |
| 4,545,288 A | | 10/1985 | Burke .......................... 92/5 R |
| 4,647,003 A | | 3/1987 | Hilpert et al. ................. 251/14 |
| 4,753,071 A | | 6/1988 | Sugden ......................... 60/475 |
| 4,877,120 A | | 10/1989 | Tysver et al. ................. 192/141 |
| 4,896,562 A | | 1/1990 | Wilkinson et al. ............. 74/626 |
| 4,900,960 A | | 2/1990 | Becker et al. ................. 310/85 |
| 4,954,799 A | * | 9/1990 | Kumar ........................ 335/236 |
| 4,994,001 A | | 2/1991 | Wilkinson et al. ............. 475/4 |
| 5,000,077 A | | 3/1991 | Habicht ........................ 91/361 |
| 5,006,901 A | * | 4/1991 | Dick ........................... 335/258 |
| 5,106,354 A | | 4/1992 | Russ et al. .................... 475/342 |
| 5,148,715 A | | 9/1992 | Blaser et al. .................. 74/325 |
| 5,149,156 A | | 9/1992 | Kleefeldt .................. 292/336.3 |
| 5,385,218 A | | 1/1995 | Migliori ...................... 188/303 |
| 5,492,050 A | | 2/1996 | Holtgraver ...................... 92/74 |
| 5,496,229 A | | 3/1996 | Miyamoto .................... 477/111 |
| 5,577,436 A | | 11/1996 | Kimbara ....................... 92/116 |
| 5,586,747 A | * | 12/1996 | Bennardo et al. ........ 251/129.18 |
| 5,806,402 A | | 9/1998 | Henry ............................ 91/61 |
| 6,029,703 A | * | 2/2000 | Erickson et al. ........ 137/625.61 |

FOREIGN PATENT DOCUMENTS

| | | | | |
|---|---|---|---|---|
| DE | 98/12787 | 3/1998 | .......... H02H/7/085 |
| EP | 0102511 A1 | 7/1983 | .......... F16H/19/00 |
| EP | 0478229 A1 | 9/1991 | ............. E05C/9/04 |

* cited by examiner

Primary Examiner—Lesley D. Morris
Assistant Examiner—Frederick Nicolas
(74) Attorney, Agent, or Firm—Daniel S. Kalka; Roger A. Johnston

(57) ABSTRACT

An apparatus (30) and method for adjusting an actuator (32) on a real-time basis includes a rack (40) extending axially over at least a portion on an outer surface of an adjustable member (36). The actuator (32) has a bore (42) that extends from the rack (40) to the outer surface (44) of the actuator (32) to receive an adjustment member (46). The adjustment member (46) includes a pinion (48) at one end for engaging the rack (40) while the adjustment member (46) is situated out of the functional flow or positioning area. Engagement of the pinion (48) of the adjustment member (46) with the rack (40) on the adjustable member (36) provides a real-time adjustment of the actuator (32) to a desired position or setting which then may be fixed or locked into that position.

13 Claims, 2 Drawing Sheets

APPARATUS AND METHOD FOR ADJUSTING AN ACTUATOR ON A REAL-TIME BASIS

BACKGROUND OF THE INVENTION

1. Field of the Invention

The present invention relates in general to the adjustment of an electro-hydraulic or electromechanical solenoid actuator, and in particular to a rack and pinion apparatus and method for adjusting an orifice or air-gap within the actuator or a solenoid on a real-time basis for calibration.

2. Description of the Related Art

Electro-hydraulic or electromechanical solenoid actuators, referred to herein as solenoids or solenoid valve assemblies or actuators typically need to have orifices and/or air-gaps within the valves or solenoids adjusted after assembly. Conventional manufacturing methods parts tolerancing usually provides an assembled position range larger than necessary for desired solenoid or actuator performance. A typical prior art method of adjusting an orifice or an air-gap is to provide a threaded portion accessible from outside the solenoid, insert a tool in a slot or receptacle, adjust the orifice or air-gap to a desired position by rotating the adjustment tool, removing the tool from the slot and then testing the solenoid to see if the calibration is acceptable.

As an example, U.S. Pat. No. 5,513,673 discloses an electrically modulated pressure regulator valve with a variable force solenoid. The solenoid valve assembly is provided with an adjustment screw for variably adjusting the axial overlap (or air-gap) between an armature body and the central bore of the adjustment screw. The axial overlap between the surface of the armature and the inner circumferential surface of the screw adjust can be adjusted by varying the position of adjustment screw relative to the closed end of the housing. This adjustment allows the working air-gap to be varied.

Similarly, in U.S. Pat. No. 4,947,893, the solenoid valve assembly includes an adjustment plug which provides means for variably adjusting the minimum working air-gap distance between the armature body member and flux collector. These patents are owned by the assignee of the present invention, and hereby incorporated by reference.

Adjustment of the orifice and/or air-gaps can be problematic in that the adjustment tool can block flows and pressures, and as such requires an offset calibration value to be used which may or may not be correlatable to preset standards. Furthermore, the adjustment tool as it engages and disengages the threaded portion can change the calibration before the adjustment is locked into place.

Thus, there still exists a need for an apparatus and method for adjusting an orifice or an air-gap within a solenoid valve assembly which results in a real-time directly measurable calibration. Preferably, such an apparatus and method would allow for adjustment on a real-time basis and would allow the positioner of the solenoid valve assembly to be secured or fixed in position while the adjustment tool is still engaged so that the adjustment is locked into place during calibration.

BRIEF SUMMARY OF THE INVENTION

An object of the present invention is to provide an apparatus for adjusting a solenoid valve assembly for real-time calibration.

Another object of the present invention is to provide a method of adjusting a solenoid valve assembly on a real-time basis.

Still another object of the present invention is to provide an apparatus for adjusting a solenoid valve assembly on a real-time basis that employs a shaft with a pinion at one end.

Still another object of the present invention is to provide a rack/gear method for adjusting a solenoid valve assembly that moves the adjustment tool out of the functional flow area resulting in a real-time directly measurable calibration.

The present invention is directed to solving the aforementioned objects as well as others by providing an apparatus and method for adjusting an actuator or solenoid on a real-time measurable calibration basis. The apparatus of the present invention comprises an actuator having at least one chamber therein, with an adjustable member movably situated within the at least one chamber. The adjustable member includes threads that extend axially over a portion on an outer surface of the adjustable member. The actuator has a bore that extends from the threads on the adjustable member to an outer surface of the actuator. An adjustment member with a plurality of splines at one end is positioned within the bore for engagement of the splines with the threads on the adjustable member to provide for a real-time adjustment of the actuator to a desired position or setting.

The present invention also comprises a method of adjusting an actuator in real-time which includes the steps of providing a geared rack on a selected portion of an outer surface of an adjustable member in an actuator. An adjustment member is positioned within a bore in the outer surface of the actuator to engage the geared rack with a pinion on the adjustment member. The adjustable member is moved to a desired position or setting where it is then secured with a retainer.

The various features of novelty which characterize the present invention are pointed out with particularity in the claims annexed to and forming a part of this disclosure. For a better understanding of the invention, its operating advantages and specific objects attained by its uses reference is made to the accompanying drawings and descriptive matter in which a preferred embodiment of the invention is illustrated.

DETAILED DESCRIPTION OF THE INVENTION

Figure 1:
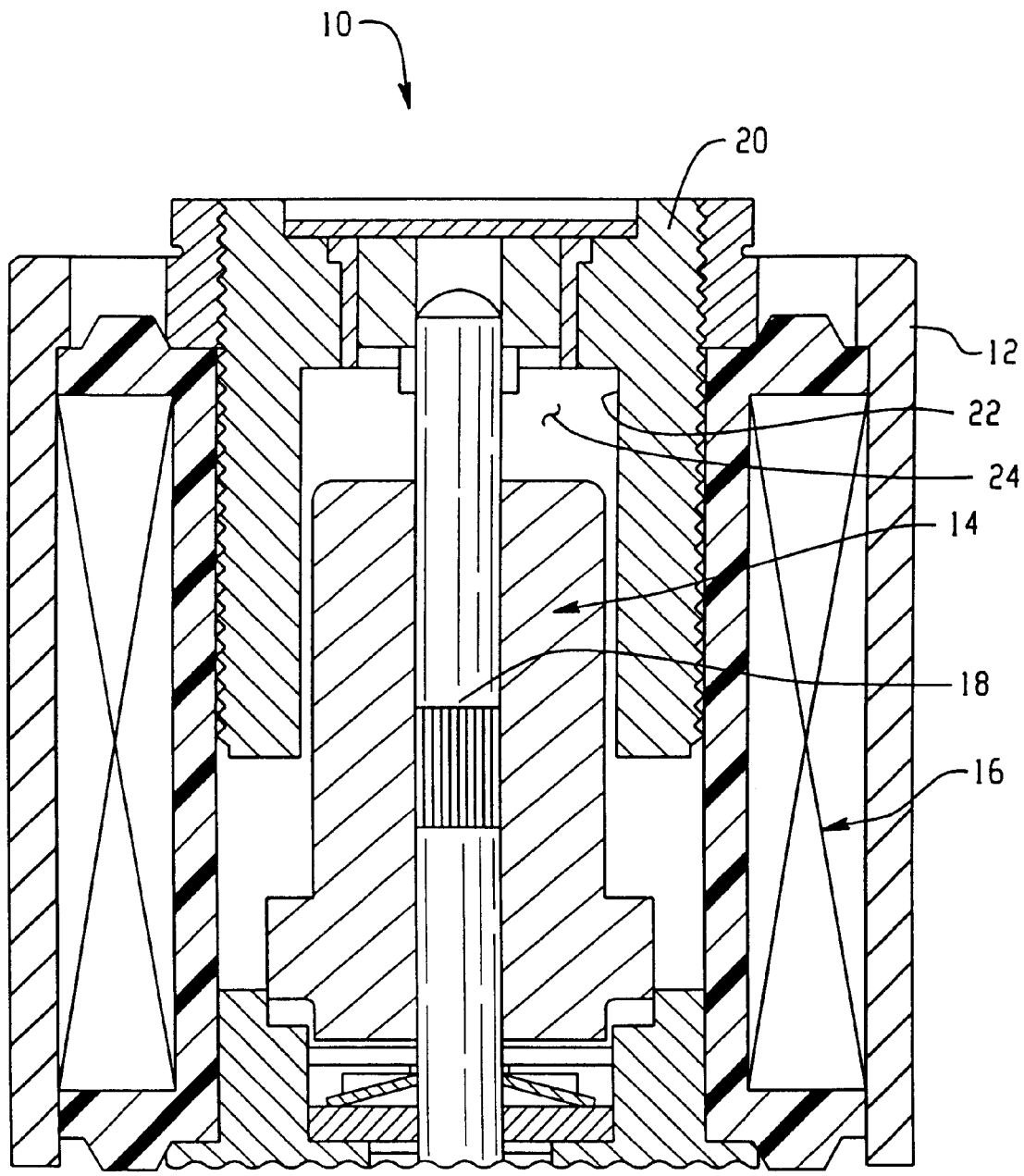
FIG. 1 is a cross-sectional elevational view of a portion of an actuator from U.S. Pat. No. 5,513,673.

Referring to the figures, where like numerals designate like or similar features, and first to FIG. 1, there is shown a cross-sectional view of a portion of an actuator generally designated 10. Actuator 10 also referred to herein as a solenoid valve assembly or simply solenoid is a device well known in this art and is described in U.S. Pat. No. 5,513,673.Thus, it requires no detailed explanation here on its structure and operation. U.S. Pat. Nos. 5,261,637; 5,513,832; 5,513,673; and 4,947,893 all are directed to various structures of solenoid valves and all are incorporated herein by reference. The present invention has applicability to these as well as other solenoids including, but not limited to, variable force solenoid assemblies or on/off solenoid operated valves.

Actuator 10 includes a housing or casing 12, an armature indicated generally at 14 movably mounted therein, and electromagnetic coil indicated generally at 16, and a valve member 18 operatively connected to the armature 14 for movement therewith. A threaded inverted cup-shaped adjustable member 20 having a central chamber or bore 22 has the closed end thereof defining an air-gap 24 with the upper end of armature 14. Adjustable member 20 is known in the art for providing a variable minimum working air-gap 24 distance.

In a solenoid design, it is typically necessary to control the air-gap distance because the attraction force between the surfaces of an air-gap for a given current flow increases and decreases exponentially with air-gap distance. Air-gap distance also can affect the linearity characteristics of the solenoid valve assembly to achieve a desired force output.

Figure 2:
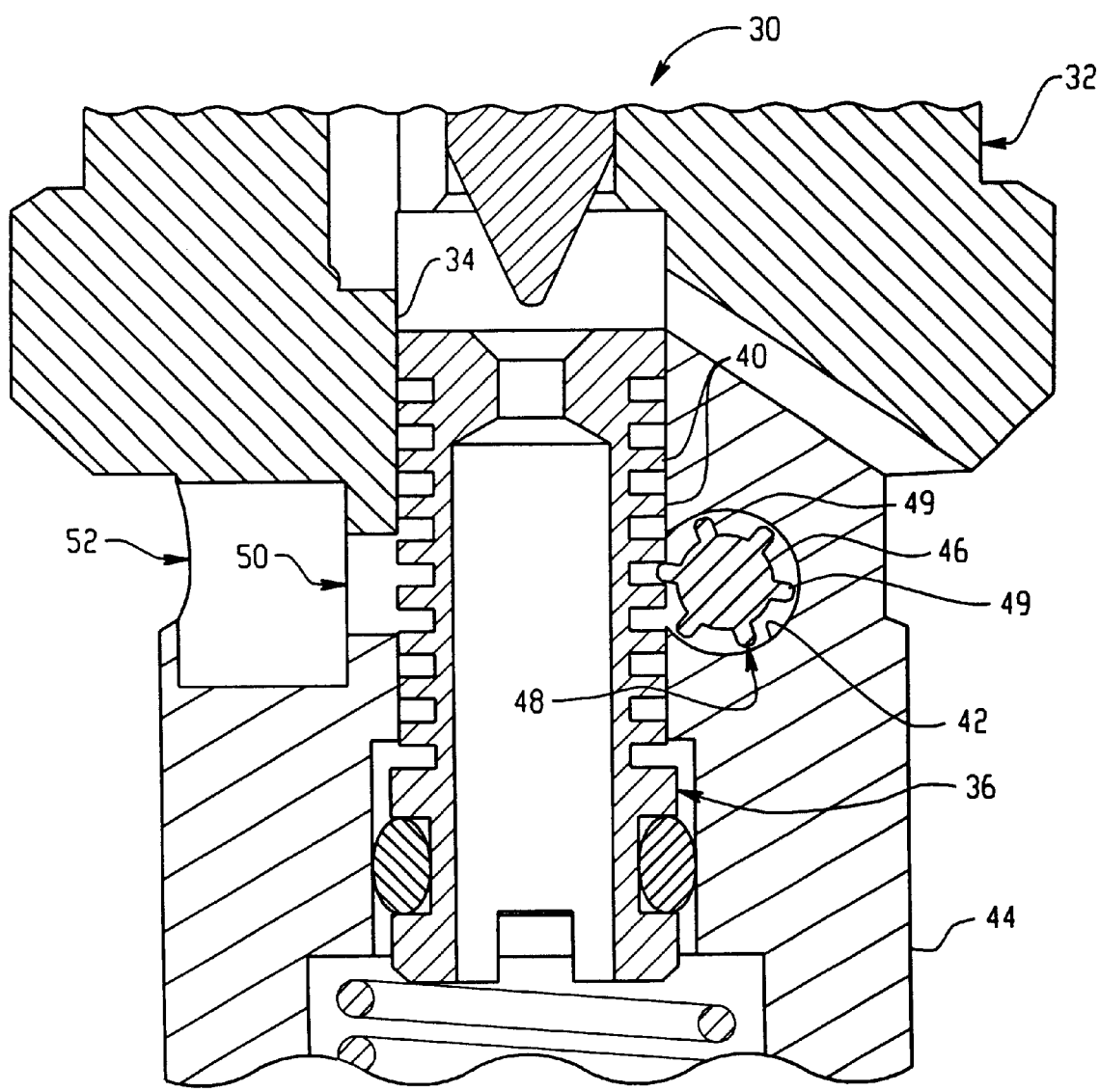
FIG. 2 is an enlarged sectional view of a portion of an actuator of the present invention.

Referring next to FIG. 2, there is shown an apparatus indicated generally at 30 of the present invention. Apparatus 30 allows for adjusting an actuator 32 on a real-time basis. Actuator 32 includes at least one chamber or bore 34 and an adjustable member 36 moveably situated therein. Actuator or solenoid valve assembly 32 is a device well known in the art and may be constructed as disclosed in the foregoing patents that are incorporated by reference herein with the additional features described as follows. As seen in FIG. 1, the adjustable member 20 is employed to variably adjust the air-gap distance (also referred to as axial overlap), and in FIG. 2 the adjustable member can also include an orifice sleeve 36. Orifice sleeve 36 preferably includes helical or circumferential grooves, or threads 40. The adjustable member 36 is constructed to move between at least a first and a second position, and can preferably provide a plurality of positions as is known in the art. Threads 40 are also referred to herein as a rack or geared rack which consists preferably of a plurality of gears circumferentially arranged on an outer surface of adjustable member 36. The actuator 32 includes a bore 42 that extends from one side of the rack 40 to an outer surface 44 of the actuator 32. Bore 42 is constructed to receive an adjustment member 46 which is preferably a shaft that is rotatably received within bore 42. Adjustment member 46 preferably includes a pinion 48 at one end which preferably comprises a plurality of spaced surfaces or splines 49 constructed to mesh and engage rack 40. Bore 42 is situated to allow the adjustment member 46 to be located out of the functional flow area of the actuator 32. Preferably, pinion 48 is tapered to minimize gear backlash and allow for accurate predictable positioning of the adjustable member 36 within the actuator 32. Because the adjustment member 46 is out of the functional flow area, the apparatus 30 according to the present invention allows for a real-time directly measurable calibration.

After the desired position of the orifice sleeve 36 or air-gap is set, or a desired setting of the actuator 32 is achieved, the adjustable member 36 is fixed into position by securing or crimping ductile material 50 located adjacent one side of the adjustable member 36. In the preferred embodiment port 52 provides an easy access to the ductile material 50 for crimping or staking the adjustable member 36 in the desired position while pinion 48 on shaft 46 engages the rack 40 on adjustable member 36. An alternate embodiment includes providing port 52 with threads for receiving a fastener, such as, a set screw, screw, bolt, or the like to secure the adjustable member in the desired position after adjustment.

The method of the present invention allows the shaft 46 with the pinion 48 to be inserted within bore 42 for engagement with the rack 40 on the adjustable member 36. The adjustable member 36 includes, but is not limited to, any mechanical positioner, an air-gap, adjustment screw or plug, or an orifice sleeve or setting member for an actuator. Shaft 46 is rotated to linearly move the adjustable member 36 to a desired position or setting for a real-time measurement or calibration of the orifice, air-gap, or positioner. While shaft 46 engages rack 40 on adjustable member 36 to move it to the desired position and hold it there, ductile material 50 is mechanically secured or crimped to fix the adjustable member 36 in the set position. After securing the adjustable member 36, shaft 46 may be retracted if desired. Preferably, shaft 46 is simply left in the engaged position, and may be cut or snapped off to a shorter length, and sealed therein with a known sealant or coating. Other embodiments of the present invention include providing a shorter shaft 46 constructed to remain with or within actuator 32. The outer end of shaft 46 may be circular, square, hexagonal, or even be constructed internally or externally to engage or receive a wrench, socket, Allen wrench, Torx, Phillips, or regular straight bladed screwdriver or similar tool to allow incremental adjustment. Other embodiments for the splined end of shaft 40 include providing splines that are preferably tapered, but may include straight, helical, or even a combination of both helical and straight splines.

While FIG. 2 particularly depicts an actuator with an orifice controlled adjustable member, the apparatus and method of the present invention are applicable to any actuator, valve or solenoid that has an adjustable member requiring adjustment after assembly, for example, setting the air-gap. Advantageously, the present invention locates the adjustment member to allow for adjustment out of the functional flow or positional area resulting in a real-time, directly measurable calibration. This is in contrast to other adjustment methods that require an offset calibration value which may or may not be correlatable.

While specific embodiments of the invention have been shown and described in detail to illustrate the application and the principles of the invention, it will be understood that the invention may be embodied otherwise without departing from such principles.

I claim:

1. An adjustable actuator providing a real-time measurable calibration, comprising:

at least one chamber disposed in said actuator, said actuator having an adjustable member movably situated within said at least one chamber, said adjustable member being constructed to move therein, said adjustable member having grooves extending axially over a portion of said adjustable member on an outer surface thereof;

said actuator having a bore extending from a plurality of threads on said adjustable member to an outer surface of said actuator;

an adjustment member, said adjustment member having a plurality of spaced surfaces at one end thereof, said adjustment member being constructed to be received within said bore for engagement of said spaced surfaces with said threads on said adjustable member for providing a real-time adjustment of said actuator for a calibrated setting; and a retainer located adjacent said adjustable member for securing said adjustable member to the calibrated setting, said retainer comprising a portion of a casing on said actuator constructed to be crimped.

2. An apparatus as recited in claim 1, wherein said retainer further comprises a fastener for securing said adjustable member to the calibrated setting.

3. An apparatus as recited in claim 1, wherein said adjustment member comprises a shaft.

4. An apparatus as recited in claim 1, wherein said adjustment member comprises a plurality of splines on a shaft, said plurality of splines being a pinion constructed to engage a rack portion of said adjustable member for transferring rotary movement of the shaft to linear movement of said adjustable member.

5. An apparatus as recited in claim 4, wherein said pinion of said adjustment member comprises a tapered pinion.

6. A method of adjusting a solenoid operated actuator or valve in real-time, comprising the steps of:

providing a geared rack on at least a portion of an outer surface of an adjustable member in an actuator;

providing a bore through an outer surface of the actuator to the geared rack on the adjustable member;

positioning an adjustment member in the bore of the actuator;

engaging the geared rack of the adjustable member with a pinion on the adjustment member;

moving the adjustable member with the adjustment member to a calibrated setting; and securing the adjustable member with a retainer in the calibrated setting.

7. A method as recited in claim 6, wherein the engaging step comprises the step of providing a plurality of splines as the pinion on one end of the adjustment member.

8. A method as recited in claim 7, wherein the providing step further comprises the step of tapering the plurality of splines.

9. A method as recited in claim 6, wherein the securing step comprises the step of securing the adjustable member at the calibrated setting while the pinion engages the rack.

10. In a solenoid valve assembly having an armature, an electromagnetic coil, and a valve member operatively connected to said armature, and a casing, the improvement comprising:

at least one threaded adjustable member disposed within said solenoid valve assembly for cooperatively defining with another member in said solenoid valve assembly a predetermined spacing between the adjustable member and the other member;

a bore extending from said threaded adjustable member out through a casing of said solenoid valve assembly; and an adjustment member disposed within said bore, said adjustment member having splines constructed to engage said threaded adjustable member for moving said adjustable member to a set position for obtaining the predetermined spacing between said adjustable member and the other member for a real-time calibration of the solenoid valve assembly.

11. The improved solenoid valve assembly as recited in claim 10, wherein said predetermined spacing comprises an air-gap.

12. The improved solenoid valve assembly as recited in claim 10, wherein said predetermined spacing comprises an orifice.

13. The improved solenoid valve assembly as recited in claim 10, wherein said adjustment member comprises a shaft received within said bore, said shaft having a plurality of splines at one end thereof for engaging said threaded adjustable member.

\* \* \* \* \*